H. L. DECKER.
ELECTRICAL MEASURING INSTRUMENT.
APPLICATION FILED JAN. 14, 1919.

1,418,367.

Patented June 6, 1922.

INVENTOR
Hugh L. Decker,
By Owen, Owen & Crampton
His attys.

UNITED STATES PATENT OFFICE.

HUGH L. DECKER, OF TOLEDO, OHIO, ASSIGNOR TO THE W. G. NAGEL ELECTRIC COMPANY, OF TOLEDO, OHIO, A CORPORATION OF OHIO.

ELECTRICAL MEASURING INSTRUMENT.

1,418,367.  Specification of Letters Patent.  Patented June 6, 1922.

Application filed January 14, 1919. Serial No. 271,052.

*To all whom it may concern:*

Be it known that I, HUGH L. DECKER, a citizen of the United States, and a resident of Toledo, in the county of Lucas and State of Ohio, have invented a certain new and useful Electrical Measuring Instrument; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric measuring instruments, and more particularly to ammeters of the magnet vane type.

The object of my invention is the provision of a simple, efficient and improved instrument of the character described by which it is possible to maintain a weak but permanent magnetic strength across the poles of the magnet frame through the vane, and which enables a coil having a minimum number of turns to be used without a core, thereby obtaining the features most desired, namely, minimum effect of short circuits or abnormally heavy currents on the permanent magnet employed, low cost of manufacture and constancy of readings for currents for which the instrument is designed. Further objects and advantages will be apparent from the following detailed description.

While the invention in its broader aspect is capable of embodiment in numerous forms, a preferred embodiment thereof is illustrated in the accompanying drawings, in which,—

Figure 1:
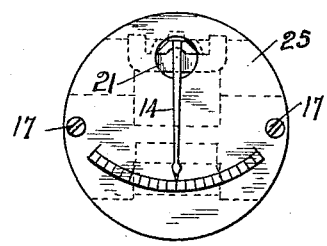
Figure 2:
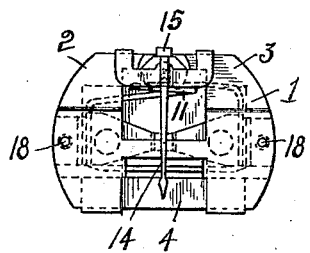
Figure 3:
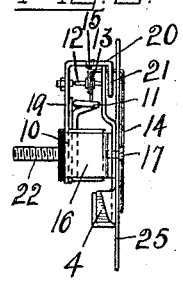
Figure 4:
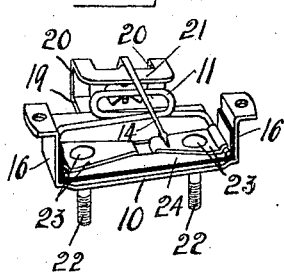
Figure 5:
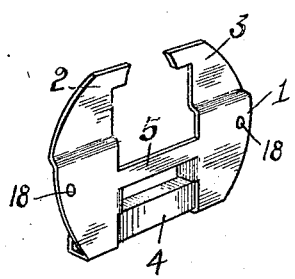
Figure 6:
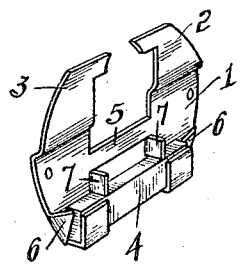

Figure 1 is a front or face view of an instrument embodying my invention. Fig. 2 is a view thereof with the face or scale plate removed. Fig. 3 is a side view of the instrument. Fig. 4 is a perspective view thereof with the face plate and magnet frame removed, and Figs. 5 and 6 are outer and inner sides, respectively, of the magnet frame and permanent magnet attached thereto.

Referring to the drawings, 1 designates the magnetic frame or element having the spaced arms 2 and 3 forming the north and south poles, respectively, at one edge portion thereof and carrying a magnet bar 4 at its opposite edge portion which forms the permanent magnet of the frame. The frame 1, in the present embodiment of the invention, is substantially of H-form with the arms at one side of the cross piece bar 5 forming the customary north and south poles and with the arms at the other side of said cross piece carrying the magnet bar 4, which spans the space therebetween and is transversely spaced from said cross piece 5. The magnet bar 4 is held to the magnet frame, in the present instance, by bending the ends of the carrying arms around the respective ends of the bar and clamping them firmly thereto. The frame is provided with ears 6 at the outer side edges of the bar carrying arms, which ears are bent over to engage the respective ends of the bar to prevent endwise movement thereof, and the frame is also provided with ears 7, which are struck up at the inner side of the bar from the inner side edges of the bar carrying arms and cooperate with the arm ends to firmly hold the bar to the frame. The frame 1 may be made of sheet metal, iron, or other suitable magnetic material, while the bar 4 alone is made of a higher grade of magnetic steel or other material suitable for the purpose, thus affording a considerable saving in magnet steel, as well as the cost of manufacture, as bars of steel of short length requiring a minimum amount of labor to form can be used. The cross piece 5 forms a shunt or keeper for the magnetic flux in the permanent magnet.

A mounting frame 10 of non-magnetic material is secured to and carries the magnet frame 1 and also carries the coil 11 and movable element of the instrument, which latter comprises the customary staff 12 and the vane 13, pointer 14 and balance 15 carried by the staff. The frame 10 is U-shaped in cross-section, being provided at opposite ends with legs 16, to the ends of which the magnetic frame is secured by screws 17 entering apertures 18 in the magnetic frame. The frame 10 is provided at the side edge thereof adjacent to the magnet frame gap with an extension or wing 19, the outer end of which has bars 20 extending toward the magnet frame and then over the ends of the pole arms 2 and 3 and connected by a cross-bar 21 in bridging relation to the gap between the pole arms.

The extension 19 and cross-bar 21 are provided with axially aligned bearings in which the ends of the staff 12 are pivotally mounted, said bearings, or one at least, being adjusted, as well understood in the art. The staff 12 is disposed in the gap between the north and south poles 2 and 3 of the magnet frame.

The coil 11, which, in the present instance, comprises one and one-half turns, is disposed in upright position between the mounting frame 10 and magnet frame 1, substantially intermediate the arms 2 and 3 of the magnet frame, but in spaced relation thereto, and has its ends connected to terminal studs 22, 22, the heads 23 of which are enlarged and adapted to clamp the coil ends to an insulating strip 24 on the frame 10. The terminal studs project through the frame 10 being insulated therefrom and are adapted to connect with circuit wires (not shown). The coil opening is centrally disposed with respect to the vane 13 and in advance thereof in the field of its magnetic influence. It will be understood that an increase in the number of turns in the coil will increase the range of movement of the pointer.

The dial plate 25 is mounted on the magnet frame 1 at the outer side thereof and is secured in position thereon by the screws 17. The pointer 14 extends over the plate 25 in position to register with the customary scale readings thereon, as is well understood in the art.

In instruments of this character heretofore used, permanent magnets in circular form have been employed, requiring the use of a large amount of expensive magnet steel, and, by reason of the magnetic strength thereof, requiring also the use of a large number of turns in the coils to actuate the moving element. To reduce the turns required in the coil for the proper reaction on the moving element, an iron core is customarily used within the coil of an instrument having large and strong permanent magnets and the resulting effect of a short circuit, or of an abnormally heavy current going through the coil, is to demagnetize the magnet, alter its permanency and destroy the accuracy of readings in subsequent use. If a weak magnet of the circular type and a coil, having a large number of turns and not having an iron core, be used, abnormally heavy currents or short circuits will permanently reduce and alter the magnetic strength and subsequent readings of the instrument.

It will be noted in my construction of instrument that the magnet frame 1 encloses or carries a small magnetic steel bar 4 and that the provision of the shunt piece or keeper 5 affords a complete path for the magnetic flux in the magnet bar 4, thereby insuring a magnet of permanency and predetermined strength and at the same time allowing the passage of a weakened magnetic flux across the gap between the north and south poles 2 and 3 of the magnet frame. In addition to this construction effecting a considerable saving in magnet steel and cost of manufacture, the weakened magnetic flux passing between the north and south poles necessarily requires a minimum number of turns in the coil to properly actuate the moving element of the instrument, which is normally held in neutral position by said magnetic flux passing through the vane 13 of the moving element.

With my construction it is possible to maintain a weak, but permanent magnetic strength, across the poles 2 and 3 of the magnet frame, and a coil consisting of a minimum number of turns and without a core can therefore be used, thus obtaining the features most desired, namely, minimum effect of short circuits or abnormally heavy currents on the permanent magnet employed, low cost of manufacture, and constancy of readings for currents for which the instrument is designed, and also avoiding the necessity of expensive individual calibration of ammeters of the vane type, which, with the constructions heretofore used, is necessary. It is also possible with my construction to maintain the magnet of constant and equal strength and permanency, which is a highly important feature in obtaining approximately uniform scale readings and in avoiding the necessity of expensive individual calibration in ammeters of the magnetic vane type.

The primary purpose of this invention is the provision of a magnet having its pole portions of relatively softer metal than a portion of the loop or pole connecting part thereof, which harder portion may or may not be integral with the pole portions, and having a keeper or shunt connecting the poles and in spaced relation to the hard or permanent magnet portion, whether at one side or the other thereof relative to the poles, whereby a permanent path for the magnetic flux is afforded between the keeper and the permanent magnet portion. This construction precludes the distortion of the magnet due to heavy currents or short circuits passing through the coil of the instrument.

I wish it understood that my invention is not limited to any specific construction, arrangement or form of the parts illustrated, as it is capable of numerous modifications and changes without departing from the spirit of the claims.

Having thus described my invention, what I claim as new, and desire to secure by Letters Patent, is,—

1. In an instrument of the class described, a frame of magnetic material having spaced arms forming north and south poles and having a connecting piece forming a keeper at their inner ends, and a permanent magnet bar carried by the frame at the inner ends of said arms and in spaced relation to said connecting piece whereby a complete path for the magnetic flux in the permanent magnet is provided through said piece.

2. In an instrument of the class described, a magnetic frame of substantially H-form having the arms at one side of its cross bar forming north and south poles, and a permanent magnet bar connecting the other arms of the frame in spaced relation to its cross bar whereby the cross bar forms a keeper for the magnetic flux in the permanent magnet bar.

3. In an instrument of the class described, a frame of magnetic material having spaced arms forming north and south poles, a shunt piece at the base of said arms, a bar of different magnetic material than said frame carried thereby in spaced relation to said shunt piece and forming a permanent magnet whereby the shunt piece forms a keeper for the magnetic flux in said bar, a mounting frame connected to said magnet frame, a moving element carried by said mounting frame and normally held in neutral position by the magnetic flux passing between the poles of the magnet frame through a part of the moving element, and a coil carried by said mounting frame in operative relation to said element and adapted to be interposed in an electric circuit.

4. In an instrument of the class described, a thin metal frame of magnetic material having spaced arms forming north and south poles and having a connecting piece forming a keeper in spaced relation to the pole ends, said frame having spurs adjacent to said keeper and in spaced relation to the pole ends, and a permanent magnet bar carried by the frame and held thereto by said spurs.

5. In an instrument of the class described, a magnetic frame of substantially H-form having the arms at one side of its cross bar forming north and south poles and the arms at the other side of its cross bar, each provided with a plurality of spurs and a permanent magnet bar carried by the frame in spaced relation to its cross bar and held thereto by engagement of the frame spurs therewith.

In testimony whereof, I have hereunto signed my name to this specification.

HUGH L. DECKER.